United States Patent
Marking

(10) Patent No.: US 10,415,662 B2
(45) Date of Patent: Sep. 17, 2019

(54) REMOTELY OPERATED BYPASS FOR A SUSPENSION DAMPER

(71) Applicant: Fox Factory, Inc., Scotts Valley, CA (US)

(72) Inventor: John Marking, El Cajon, CA (US)

(73) Assignee: Fox Factory, Inc., Braselton, GA (US)

( * ) Notice: Subject to any disclaimer, the term of this patent is extended or adjusted under 35 U.S.C. 154(b) by 0 days.

(21) Appl. No.: 15/158,502

(22) Filed: May 18, 2016

(65) Prior Publication Data

US 2016/0265615 A1  Sep. 15, 2016

Related U.S. Application Data

(63) Continuation of application No. 14/038,507, filed on Sep. 26, 2013, now Pat. No. 9,353,818, which is a (Continued)

(51) Int. Cl.
*F16F 9/46* (2006.01)
*F16F 9/34* (2006.01)
(Continued)

(52) U.S. Cl.
CPC ............ *F16F 9/46* (2013.01); *B60G 13/06* (2013.01); *B60G 13/08* (2013.01); *B60G 17/08* (2013.01); *F16F 9/18* (2013.01); *F16F 9/19* (2013.01); *F16F 9/34* (2013.01); *F16F 9/464* (2013.01); *B60G 2202/24* (2013.01)

(58) Field of Classification Search
CPC .. F16F 9/18; F16F 9/3235; F16F 9/065; F16F 9/46; F16F 9/468; F16F 9/466; F16F 9/34; F16F 9/342; F16F 9/461; F16F 9/464; B60G 13/06; B60G 13/08; B60G 17/06; B60G 17/08
USPC ....... 188/266.1, 266.2, 313, 285–287, 282.2, 188/282.8, 299.1, 281, 322.2, 322.15, 188/322.13
See application file for complete search history.

(56) References Cited

U.S. PATENT DOCUMENTS

| 435,995 A | 9/1890 | Dunlop |
| 1,492,731 A | 5/1924 | Kerr |

(Continued)

FOREIGN PATENT DOCUMENTS

| DE | 3709447 A1 * | 10/1988 | ............. F16F 9/532 |
| DE | 3711442 A1 | 10/1988 | |

(Continued)

OTHER PUBLICATIONS

English language abstract for EP 0207409 (no date).
(Continued)

*Primary Examiner* — Thomas J Williams

(57) ABSTRACT

A damper assembly with a bypass for a vehicle comprises a pressure cylinder with a piston and piston rod for limiting the flow rate of damping fluid as passes from a first to a second side of said piston. A bypass provides fluid pathway between the first and second sides of the piston separately from the flow rare limitation. In one aspect, the bypass is remotely controllable from a passenger compartment of the vehicle. In another aspect, the bypass is remotely controllable based upon one or more variable parameters associated with the vehicle.

21 Claims, 4 Drawing Sheets

Related U.S. Application Data continuation of application No. 13/010,697, filed on Jan. 20, 2011, now Pat. No. 8,857,580.

(60) Provisional application No. 61/296,826, filed on Jan. 20, 2010.

(51) Int. Cl.
    *B60G 17/08*   (2006.01)
    *B60G 13/06*   (2006.01)
    *F16F 9/19*    (2006.01)
    *F16F 9/18*    (2006.01)
    *B60G 13/08*   (2006.01)

(56) References Cited

U.S. PATENT DOCUMENTS

| | | |
|---|---|---|
| 1,575,973 A | 3/1926 | Coleman |
| 1,948,600 A | 2/1934 | Templeton |
| 2,018,312 A | 10/1935 | Moulton |
| 2,259,437 A | 10/1941 | Dean |
| 2,492,331 A | 12/1949 | Spring |
| 2,540,525 A | 2/1951 | Howarth et al. |
| 2,697,600 A | 12/1954 | Gregoire |
| 2,725,076 A | 11/1955 | Hansen et al. |
| 2,729,308 A | 1/1956 | Koski et al. |
| 2,784,962 A | 3/1957 | Sherburne |
| 2,838,140 A | 6/1958 | Rasmusson et al. |
| 2,846,028 A | 8/1958 | Gunther |
| 2,879,971 A | 3/1959 | Demay |
| 2,897,613 A | 8/1959 | Davidson et al. |
| 2,941,629 A | 6/1960 | Etienne et al. |
| 2,991,804 A | 7/1961 | Merkle |
| 3,087,583 A | 4/1963 | Bruns |
| 3,202,413 A | 8/1965 | Colmerauer |
| 3,206,153 A | 9/1965 | Burke |
| 3,284,076 A | 11/1966 | Gibson |
| 3,286,797 A | 11/1966 | Leibfritz et al. |
| 3,405,625 A | 10/1968 | Carlson et al. |
| 3,419,849 A | 12/1968 | Anderson et al. |
| 3,420,493 A | 1/1969 | Kraft et al. |
| 3,528,700 A | 9/1970 | Janu et al. |
| 3,537,722 A | 11/1970 | Moulton |
| 3,556,137 A | 1/1971 | Henry et al. |
| 3,559,027 A | 1/1971 | Arsem |
| 3,584,331 A | 6/1971 | Richard et al. |
| 3,603,575 A | 9/1971 | Arlasky et al. |
| 3,605,960 A | 9/1971 | Singer |
| 3,621,950 A | 11/1971 | Lutz |
| 3,701,544 A | 10/1972 | Stankovich |
| 3,714,953 A | 2/1973 | Solvang |
| 3,750,856 A | 8/1973 | Kenworthy et al. |
| 3,791,408 A | 2/1974 | Saitou et al. |
| 3,830,482 A | 8/1974 | Norris |
| 3,941,402 A | 3/1976 | Yankowski et al. |
| 4,022,113 A | 5/1977 | Blatt et al. |
| 4,036,335 A | 7/1977 | Thompson et al. |
| 4,072,087 A | 2/1978 | Mueller et al. |
| 4,103,881 A | 8/1978 | Simich |
| 4,121,610 A | 10/1978 | Harms et al. |
| 4,139,186 A | 2/1979 | Postema et al. |
| 4,153,237 A | 5/1979 | Supalla |
| 4,159,106 A | 6/1979 | Nyman et al. |
| 4,174,098 A | 11/1979 | Baker et al. |
| 4,183,509 A | 1/1980 | Nishikawa et al. |
| 4,305,566 A | 12/1981 | Grawunde |
| 4,333,668 A | 6/1982 | Hendrickson et al. |
| 4,334,711 A | 6/1982 | Mazur et al. |
| 4,337,850 A | 7/1982 | Shimokura et al. |
| 4,348,016 A | 9/1982 | Milly |
| 4,351,515 A | 9/1982 | Yoshida |
| 4,366,969 A | 1/1983 | Benya et al. |
| 4,474,363 A | 10/1984 | Numazawa et al. |
| 4,491,207 A | 1/1985 | Boonchanta et al. |
| 4,502,673 A * | 3/1985 | Clark .................. B62D 33/071 180/89.15 |
| 4,546,959 A | 10/1985 | Tanno |
| 4,548,233 A | 10/1985 | Woelfges et al. |
| 4,570,851 A | 2/1986 | Cirillo et al. |
| 4,572,317 A | 2/1986 | Isono et al. |
| 4,620,619 A | 11/1986 | Emura et al. |
| 4,634,142 A | 1/1987 | Woods et al. |
| 4,659,104 A | 4/1987 | Tanaka et al. |
| 4,660,689 A | 4/1987 | Hayashi et al. |
| 4,673,194 A | 6/1987 | Sugasawa |
| 4,709,779 A | 12/1987 | Takehara |
| 4,729,459 A | 3/1988 | Inagaki et al. |
| 4,732,244 A | 3/1988 | Verkuylen |
| 4,743,000 A | 5/1988 | Karnopp |
| 4,744,444 A | 5/1988 | Gillingham |
| 4,750,735 A | 6/1988 | Furgerson et al. |
| 4,765,648 A | 8/1988 | Mander et al. |
| 4,773,671 A | 9/1988 | Inagaki |
| 4,786,034 A | 11/1988 | Heess et al. |
| 4,815,575 A | 3/1989 | Murty et al. |
| 4,821,852 A | 4/1989 | Yokoya |
| 4,826,207 A | 5/1989 | Yoshioka et al. |
| 4,830,395 A | 5/1989 | Foley |
| 4,836,578 A | 6/1989 | Soltis |
| 4,838,394 A * | 6/1989 | Lemme .................. B60G 17/08 188/282.1 |
| 4,846,317 A | 7/1989 | Hudgens |
| 4,858,733 A | 8/1989 | Noguchi et al. |
| 4,919,166 A | 4/1990 | Sims et al. |
| 4,936,423 A | 6/1990 | Karnopp |
| 4,936,424 A | 6/1990 | Costa |
| 4,949,989 A | 8/1990 | Kakizaki et al. |
| 4,958,706 A | 9/1990 | Richardson et al. |
| 4,972,928 A | 11/1990 | Sirven |
| 4,975,849 A | 12/1990 | Ema et al. |
| 4,984,819 A | 1/1991 | Kakizaki et al. |
| 4,986,393 A | 1/1991 | Preukschat et al. |
| 5,027,303 A | 6/1991 | Witte |
| 5,044,614 A | 9/1991 | Rau |
| 5,060,959 A | 10/1991 | Davis et al. |
| 5,076,404 A | 12/1991 | Gustafsson |
| 5,080,392 A | 1/1992 | Bazergui |
| 5,105,918 A | 4/1992 | Hagiwara et al. |
| 5,113,980 A | 5/1992 | Furrer et al. |
| 5,152,547 A | 10/1992 | Davis |
| 5,161,653 A | 11/1992 | Hare |
| 5,163,742 A | 11/1992 | Topfer et al. |
| 5,178,242 A | 1/1993 | Nakamura et al. |
| 5,186,481 A | 2/1993 | Turner |
| 5,203,584 A | 4/1993 | Butsuen et al. |
| 5,207,774 A | 5/1993 | Wolfe et al. |
| 5,230,364 A | 7/1993 | Leng et al. |
| 5,236,169 A | 8/1993 | Johnsen et al. |
| 5,248,014 A | 9/1993 | Ashiba |
| 5,259,487 A | 11/1993 | Petek et al. |
| 5,263,559 A | 11/1993 | Mettner |
| 5,265,902 A | 11/1993 | Lewis |
| 5,277,283 A | 1/1994 | Yamaoka et al. |
| 5,284,330 A | 2/1994 | Carlson et al. |
| 5,293,971 A | 3/1994 | Kanari |
| 5,307,907 A | 5/1994 | Nakamura et al. |
| 5,318,066 A | 6/1994 | Burgorf et al. |
| 5,328,004 A * | 7/1994 | Fannin .................. F16F 9/466 188/266.5 |
| 5,348,112 A | 9/1994 | Vaillancourt |
| 5,372,224 A | 12/1994 | Samonil et al. |
| 5,390,949 A | 2/1995 | Naganathan et al. |
| 5,392,885 A * | 2/1995 | Patzenhauer ............ F16F 9/46 188/266.6 |
| 5,396,973 A | 3/1995 | Schwemmer et al. |
| 5,398,787 A | 3/1995 | Woessner et al. |
| 5,413,196 A | 5/1995 | Forster |
| 5,467,280 A | 11/1995 | Kimura |
| 5,480,011 A | 1/1996 | Nagai et al. |
| 5,551,674 A | 9/1996 | Johnsen |
| 5,553,836 A | 9/1996 | Ericson |
| 5,588,510 A | 12/1996 | Wilke |
| 5,597,180 A | 1/1997 | Ganzel et al. |

(56) References Cited

U.S. PATENT DOCUMENTS

| | | |
|---|---|---|
| 5,598,337 A | 1/1997 | Butsuen et al. |
| 5,601,164 A | 2/1997 | Ohsaki et al. |
| 5,611,413 A | 3/1997 | Feigel |
| 5,651,433 A | 7/1997 | Wirth et al. |
| 5,657,840 A | 8/1997 | Lizell |
| 5,699,885 A | 12/1997 | Forster |
| 5,722,645 A | 3/1998 | Reitter |
| 5,803,443 A | 9/1998 | Chang |
| 5,810,128 A | 9/1998 | Eriksson et al. |
| 5,813,731 A | 9/1998 | Newman et al. |
| 5,826,935 A | 10/1998 | Defreitas et al. |
| 5,884,921 A | 3/1999 | Katsuda et al. |
| 5,937,975 A | 8/1999 | Forster et al. |
| 5,947,238 A | 9/1999 | Jolly et al. |
| 5,952,823 A | 9/1999 | Sprecher et al. |
| 5,954,318 A | 9/1999 | Kluhsman |
| 5,956,951 A | 9/1999 | O''Callaghan |
| 5,957,252 A | 9/1999 | Berthold |
| 5,971,116 A | 10/1999 | Franklin |
| 5,992,450 A | 11/1999 | Parker et al. |
| 5,996,745 A | 12/1999 | Jones et al. |
| 5,996,746 A | 12/1999 | Turner et al. |
| 5,999,868 A | 12/1999 | Beno et al. |
| 6,000,702 A | 12/1999 | Streiter |
| 6,035,979 A | 3/2000 | Foerster |
| 6,058,340 A | 5/2000 | Uchiyama et al. |
| 6,067,490 A | 5/2000 | Ichimaru et al. |
| 6,073,536 A | 6/2000 | Campbell |
| 6,073,736 A | 6/2000 | Franklin |
| 6,092,011 A | 7/2000 | Hiramoto et al. |
| 6,092,816 A | 7/2000 | Sekine et al. |
| 6,131,709 A | 10/2000 | Jolly et al. |
| 6,135,434 A | 10/2000 | Marking |
| 6,151,930 A | 11/2000 | Carlson |
| 6,179,098 B1 | 1/2001 | Hayakawa et al. |
| 6,213,263 B1 | 4/2001 | De Frenne |
| 6,215,217 B1 | 4/2001 | Kurosawa et al. |
| 6,217,049 B1 | 4/2001 | Becker |
| 6,244,398 B1 | 6/2001 | Girvin et al. |
| 6,254,067 B1 | 7/2001 | Yih |
| 6,279,702 B1 | 8/2001 | Koh |
| 6,293,530 B1 | 9/2001 | Delorenzis et al. |
| 6,296,092 B1 | 10/2001 | Marking et al. |
| 6,311,962 B1 | 11/2001 | Marking |
| 6,318,525 B1 | 11/2001 | Vignocchi et al. |
| 6,321,888 B1 | 11/2001 | Reybrouck et al. |
| 6,322,468 B1 | 11/2001 | Wing et al. |
| 6,343,807 B1 | 2/2002 | Rathbun |
| 6,360,857 B1 | 3/2002 | Fox et al. |
| 6,371,262 B1 | 4/2002 | Katou et al. |
| 6,371,267 B1 | 4/2002 | Kao et al. |
| 6,378,885 B1 | 4/2002 | Ellsworth et al. |
| 6,389,341 B1 | 5/2002 | Davis |
| 6,390,747 B1 | 5/2002 | Commins |
| 6,394,238 B1 | 5/2002 | Rogala |
| 6,401,883 B1 | 6/2002 | Nyce et al. |
| 6,415,895 B2 | 7/2002 | Marking et al. |
| 6,418,360 B1 | 7/2002 | Spivey et al. |
| 6,427,812 B2 | 8/2002 | Crawley et al. |
| 6,434,460 B1 | 8/2002 | Uchino et al. |
| 6,446,771 B1 | 9/2002 | Sintorn et al. |
| 6,467,593 B1 | 10/2002 | Corradini et al. |
| 6,474,454 B2 | 11/2002 | Matsumoto et al. |
| 6,474,753 B1 | 11/2002 | Rieth et al. |
| 6,501,554 B1 | 12/2002 | Hackney et al. |
| 6,502,837 B1 | 1/2003 | Hamilton et al. |
| 6,510,929 B1 | 1/2003 | Gordaninejad et al. |
| 6,527,093 B2 | 3/2003 | Oliver et al. |
| 6,592,136 B2 | 7/2003 | Becker et al. |
| 6,604,751 B2 | 8/2003 | Fox |
| 6,619,615 B1 | 9/2003 | Mayr et al. |
| 6,648,109 B2 | 11/2003 | Farr et al. |
| 6,659,240 B2 | 12/2003 | Dernebo |
| 6,659,241 B2 * | 12/2003 | Sendrea .................... F16F 9/44 188/314 |
| 6,672,687 B2 | 1/2004 | Nishio |
| 6,722,678 B2 | 4/2004 | McAndrews |
| 6,732,033 B2 | 5/2004 | Laplante et al. |
| 6,755,113 B2 | 6/2004 | Shih |
| 6,782,980 B2 | 8/2004 | Nakadate |
| 6,817,454 B2 | 11/2004 | Nezu et al. |
| 6,840,257 B2 | 1/2005 | Dario et al. |
| 6,857,625 B2 | 2/2005 | Löser et al. |
| 6,863,291 B2 | 3/2005 | Miyoshi |
| 6,905,203 B2 | 6/2005 | Kremers et al. |
| 6,920,951 B2 | 7/2005 | Song et al. |
| 6,923,853 B2 | 8/2005 | Kremers et al. |
| 6,935,157 B2 | 8/2005 | Miller |
| 6,952,060 B2 | 10/2005 | Goldner et al. |
| 6,959,921 B2 | 11/2005 | Rose |
| 6,966,412 B2 | 11/2005 | Braswell et al. |
| 6,978,871 B2 | 12/2005 | Holiviers |
| 6,978,872 B2 | 12/2005 | Turner |
| 6,991,076 B2 | 1/2006 | McAndrews |
| 7,025,367 B2 | 4/2006 | McKinnon et al. |
| 7,076,351 B2 | 7/2006 | Hamilton et al. |
| 7,128,192 B2 | 10/2006 | Fox |
| 7,135,794 B2 | 11/2006 | Kühnel |
| 7,147,207 B2 | 12/2006 | Jordan et al. |
| 7,163,222 B2 | 1/2007 | Becker et al. |
| 7,234,575 B2 | 6/2007 | Anderfaas et al. |
| 7,234,680 B2 | 6/2007 | Hull et al. |
| 7,243,763 B2 | 7/2007 | Carlson |
| 7,270,221 B2 | 9/2007 | McAndrews |
| 7,287,760 B1 | 10/2007 | Quick et al. |
| 7,293,764 B2 | 11/2007 | Fang |
| 7,299,112 B2 | 11/2007 | Laplante et al. |
| 7,316,406 B2 | 1/2008 | Kimura et al. |
| 7,325,660 B2 | 2/2008 | Norgaard et al. |
| 7,363,129 B1 | 4/2008 | Barnicle et al. |
| 7,374,028 B2 | 5/2008 | Fox |
| 7,397,355 B2 | 7/2008 | Tracy |
| 7,413,062 B2 | 8/2008 | Vandewal |
| 7,413,063 B1 | 8/2008 | Davis |
| 7,422,092 B2 | 9/2008 | Hitchcock et al. |
| 7,441,638 B2 | 10/2008 | Hanawa |
| 7,469,910 B2 | 12/2008 | Münster et al. |
| 7,484,603 B2 | 2/2009 | Fox |
| 7,490,705 B2 | 2/2009 | Fox |
| 7,569,952 B1 | 8/2009 | Bono et al. |
| 7,581,743 B2 | 9/2009 | Graney et al. |
| 7,591,352 B2 | 9/2009 | Hanawa |
| 7,600,616 B2 | 10/2009 | Anderfaas et al. |
| 7,628,259 B2 | 12/2009 | Norgaard et al. |
| 7,631,882 B2 | 12/2009 | Hirao et al. |
| 7,654,369 B2 | 2/2010 | Murray et al. |
| 7,673,936 B2 | 3/2010 | Hsu et al. |
| 7,684,911 B2 | 3/2010 | Seifert et al. |
| 7,694,785 B2 | 4/2010 | Nakadate |
| 7,694,987 B2 | 4/2010 | McAndrews |
| 7,722,056 B2 | 5/2010 | Inoue et al. |
| 7,722,069 B2 | 5/2010 | Shirai |
| 7,726,042 B2 | 6/2010 | Meschan |
| 7,730,906 B2 | 6/2010 | Kleinert et al. |
| 7,770,701 B1 | 8/2010 | Davis |
| 7,779,974 B2 | 8/2010 | Timoney et al. |
| 7,795,711 B2 | 9/2010 | Sauciuc et al. |
| 7,837,213 B2 | 11/2010 | Colegrove et al. |
| 7,857,325 B2 | 12/2010 | Copsey et al. |
| 7,909,348 B2 | 3/2011 | Klieber et al. |
| 7,931,132 B2 | 4/2011 | Braun |
| 7,946,163 B2 | 5/2011 | Gartner |
| 7,975,814 B2 | 7/2011 | Soederdahl |
| 8,016,349 B2 | 9/2011 | Mouri et al. |
| 8,056,392 B2 | 11/2011 | Ryan et al. |
| 8,087,676 B2 | 1/2012 | McIntyre |
| 8,091,910 B2 | 1/2012 | Hara et al. |
| 8,104,591 B2 | 1/2012 | Barefoot et al. |
| 8,121,785 B2 | 2/2012 | Swisher et al. |
| 8,127,900 B2 | 3/2012 | Inoue |
| 8,136,877 B2 | 3/2012 | Walsh et al. |
| 8,151,952 B2 | 4/2012 | Lenz et al. |
| 8,191,964 B2 | 6/2012 | Hsu et al. |
| 8,210,106 B2 | 7/2012 | Tai et al. |

(56) References Cited

U.S. PATENT DOCUMENTS

| | | |
|---|---|---|
| 8,210,330 B2 | 7/2012 | Vandewal |
| 8,256,587 B2 | 9/2012 | Bakke et al. |
| 8,262,062 B2 | 9/2012 | Kamo et al. |
| 8,262,100 B2 | 9/2012 | Thomas |
| 8,286,982 B2 | 10/2012 | Plantet et al. |
| 8,291,889 B2 | 10/2012 | Shafer et al. |
| 8,292,274 B2 | 10/2012 | Adoline et al. |
| 8,307,965 B2 | 11/2012 | Föster et al. |
| 8,308,124 B2 | 11/2012 | Hsu |
| 8,317,261 B2 | 11/2012 | Walsh et al. |
| 8,336,683 B2 | 12/2012 | McAndrews et al. |
| 8,364,389 B2 | 1/2013 | Dorogusker et al. |
| 8,393,446 B2 | 3/2013 | Haugen |
| 8,413,773 B2 | 4/2013 | Anderfaas et al. |
| 8,423,244 B2 | 4/2013 | Proemm et al. |
| 8,458,080 B2 | 6/2013 | Shirai |
| 8,550,551 B2 | 10/2013 | Shirai |
| 8,556,048 B2 | 10/2013 | Maeda et al. |
| 8,556,049 B2 | 10/2013 | Jee |
| 8,596,663 B2 | 12/2013 | Shirai et al. |
| 8,627,932 B2 | 1/2014 | Marking |
| 8,641,073 B2 | 2/2014 | Lee et al. |
| 8,651,251 B2 | 2/2014 | Preukschat et al. |
| 8,655,548 B2 | 2/2014 | Ichida et al. |
| 8,744,699 B2 | 6/2014 | Yamaguchi et al. |
| 8,752,682 B2 | 6/2014 | Park et al. |
| 8,770,357 B2 | 7/2014 | Sims et al. |
| 8,781,680 B2 | 7/2014 | Ichida et al. |
| 8,781,690 B2 | 7/2014 | Hara et al. |
| 8,814,109 B2 | 8/2014 | Calendrille et al. |
| 8,833,786 B2 | 9/2014 | Camp et al. |
| 8,838,335 B2 | 9/2014 | Bass et al. |
| 8,857,580 B2 | 10/2014 | Marking |
| 8,888,115 B2 | 11/2014 | Chubbuck et al. |
| 8,950,771 B2 | 2/2015 | Felsl et al. |
| 8,955,653 B2 | 2/2015 | Marking |
| 8,967,343 B2 | 3/2015 | Battlogg et al. |
| 8,991,571 B2 | 3/2015 | Murakami |
| 9,033,122 B2 | 5/2015 | Ericksen et al. |
| 9,038,791 B2 | 5/2015 | Marking |
| 9,073,592 B2 | 7/2015 | Hsu |
| 9,120,362 B2 | 9/2015 | Marking |
| 9,126,647 B2 | 9/2015 | Kuo |
| 9,140,325 B2 | 9/2015 | Cox et al. |
| 9,157,523 B2 | 10/2015 | Miki et al. |
| 9,194,456 B2 | 11/2015 | Laird et al. |
| 9,199,690 B2 | 12/2015 | Watarai |
| 9,239,090 B2 | 1/2016 | Marking |
| 9,278,598 B2 | 3/2016 | Galasso et al. |
| 9,353,818 B2 | 5/2016 | Marking |
| 9,366,307 B2 | 6/2016 | Marking |
| 9,422,018 B2 | 8/2016 | Pelot et al. |
| 9,452,654 B2 | 9/2016 | Ericksen |
| 9,550,405 B2 | 1/2017 | Marking et al. |
| 9,556,925 B2 | 1/2017 | Marking |
| 9,616,728 B2 | 4/2017 | Marking |
| 9,663,181 B2 | 5/2017 | Ericksen et al. |
| 9,682,604 B2 | 6/2017 | Cox et al. |
| 9,975,598 B2 | 5/2018 | Bender et al. |
| 10,036,443 B2 | 7/2018 | Galasso et al. |
| 10,040,329 B2 | 8/2018 | Ericksen et al. |
| 10,072,724 B2 | 9/2018 | Haugen et al. |
| 10,086,670 B2 | 10/2018 | Galasso et al. |
| 10,094,443 B2 | 10/2018 | Marking |
| 10,330,171 B2 | 6/2019 | Cox et al. |
| 10,336,148 B2 | 7/2019 | Ericksen et al. |
| 10,336,149 B2 | 7/2019 | Ericksen et al. |
| 2001/0017334 A1 | 8/2001 | Vincent |
| 2001/0042663 A1 | 11/2001 | Marking et al. |
| 2002/0000352 A1 | 1/2002 | Matsumoto et al. |
| 2002/0032508 A1 | 3/2002 | Uchino et al. |
| 2002/0050518 A1 | 5/2002 | Roustaei |
| 2002/0063469 A1 | 5/2002 | Nishio |
| 2002/0089107 A1 | 7/2002 | Koh |
| 2002/0121416 A1 | 9/2002 | Katayama et al. |
| 2002/0130000 A1 | 9/2002 | Lisenker et al. |
| 2002/0130003 A1 | 9/2002 | Lisenker et al. |
| 2002/0185581 A1 | 12/2002 | Trask et al. |
| 2003/0001346 A1 | 1/2003 | Hamilton et al. |
| 2003/0001358 A1 | 1/2003 | Becker et al. |
| 2003/0034697 A1 | 2/2003 | Goldner et al. |
| 2003/0051954 A1 | 3/2003 | Sendrea |
| 2003/0065430 A1 | 4/2003 | Lu et al. |
| 2003/0075403 A1 | 4/2003 | Dernebo |
| 2003/0103651 A1 | 6/2003 | Novak |
| 2003/0160369 A1 | 8/2003 | Laplante et al. |
| 2003/0191567 A1 | 10/2003 | Gentilcore |
| 2004/0017455 A1 | 1/2004 | Kremers et al. |
| 2004/0021754 A1 | 2/2004 | Kremers et al. |
| 2004/0075350 A1 | 4/2004 | Kuhnel |
| 2004/0099312 A1 | 5/2004 | Boyer et al. |
| 2004/0208687 A1 | 10/2004 | Sicz et al. |
| 2004/0222056 A1 | 11/2004 | Fox |
| 2004/0256778 A1 | 12/2004 | Verriet |
| 2005/0077131 A1 | 4/2005 | Russell |
| 2005/0098401 A1 | 5/2005 | Hamilton et al. |
| 2005/0110229 A1 | 5/2005 | Kimura et al. |
| 2005/0121269 A1 | 6/2005 | Namuduri |
| 2005/0173849 A1 | 8/2005 | Vandewal |
| 2005/0195094 A1 | 9/2005 | White |
| 2005/0199455 A1 | 9/2005 | Browne et al. |
| 2006/0064223 A1 | 3/2006 | Voss |
| 2006/0065496 A1 | 3/2006 | Fox et al. |
| 2006/0066074 A1 | 3/2006 | Turner et al. |
| 2006/0081431 A1 | 4/2006 | Breese et al. |
| 2006/0096817 A1* | 5/2006 | Norgaard .............. F16F 9/44 188/275 |
| 2006/0113834 A1 | 6/2006 | Hanawa |
| 2006/0124414 A1 | 6/2006 | Hanawa |
| 2006/0137934 A1 | 6/2006 | Kurth |
| 2006/0163551 A1 | 7/2006 | Coenen et al. |
| 2006/0163787 A1 | 7/2006 | Munster et al. |
| 2006/0175792 A1 | 8/2006 | Sicz et al. |
| 2006/0213082 A1 | 9/2006 | Meschan |
| 2006/0219503 A1 | 10/2006 | Kim |
| 2006/0225976 A1 | 10/2006 | Nakadate |
| 2006/0237272 A1 | 10/2006 | Huang |
| 2006/0289258 A1 | 12/2006 | Fox |
| 2007/0007743 A1 | 1/2007 | Becker et al. |
| 2007/0008096 A1 | 1/2007 | Tracy |
| 2007/0021885 A1 | 1/2007 | Soehren |
| 2007/0034464 A1 | 2/2007 | Barefoot |
| 2007/0039790 A1 | 2/2007 | Timoney et al. |
| 2007/0051573 A1 | 3/2007 | Norgaard et al. |
| 2007/0088475 A1 | 4/2007 | Nordgren et al. |
| 2007/0090518 A1 | 4/2007 | Sauciuc et al. |
| 2007/0119669 A1 | 5/2007 | Anderfaas et al. |
| 2007/0170688 A1 | 7/2007 | Watson |
| 2008/0006494 A1 | 1/2008 | Vandewal |
| 2008/0018065 A1 | 1/2008 | Hirao et al. |
| 2008/0029730 A1 | 2/2008 | Kamo et al. |
| 2008/0041677 A1 | 2/2008 | Namuduri |
| 2008/0059025 A1 | 3/2008 | Furuichi et al. |
| 2008/0067019 A1 | 3/2008 | Jensen et al. |
| 2008/0093820 A1 | 4/2008 | McAndrews |
| 2008/0099968 A1 | 5/2008 | Schroeder |
| 2008/0116622 A1 | 5/2008 | Fox |
| 2008/0185244 A1 | 8/2008 | Maeda et al. |
| 2008/0250844 A1 | 10/2008 | Gartner |
| 2008/0303320 A1 | 12/2008 | Schranz et al. |
| 2008/0314706 A1 | 12/2008 | Lun et al. |
| 2009/0000885 A1 | 1/2009 | McAndrews |
| 2009/0001684 A1 | 1/2009 | McAndrews et al. |
| 2009/0020382 A1 | 1/2009 | Van Weelden et al. |
| 2009/0071773 A1 | 3/2009 | Lun |
| 2009/0121398 A1 | 5/2009 | Inoue |
| 2009/0138157 A1 | 5/2009 | Hagglund et al. |
| 2009/0171532 A1 | 7/2009 | Ryan et al. |
| 2009/0192673 A1 | 7/2009 | Song et al. |
| 2009/0200126 A1 | 8/2009 | Kondo et al. |
| 2009/0236807 A1 | 9/2009 | Wootten et al. |
| 2009/0261542 A1 | 10/2009 | McIntyre |
| 2009/0277736 A1 | 11/2009 | McAndrews et al. |
| 2009/0288924 A1 | 11/2009 | Murray et al. |

(56) References Cited

U.S. PATENT DOCUMENTS

| | | |
|---|---|---|
| 2009/0294231 A1 | 12/2009 | Carlson et al. |
| 2009/0302558 A1 | 12/2009 | Shirai |
| 2009/0324327 A1 | 12/2009 | McAndrews et al. |
| 2010/0010709 A1 | 1/2010 | Song |
| 2010/0032254 A1 | 2/2010 | Anderfaas et al. |
| 2010/0044975 A1 | 2/2010 | Yablon et al. |
| 2010/0059964 A1 | 3/2010 | Morris |
| 2010/0066051 A1 | 3/2010 | Haugen |
| 2010/0109277 A1* | 5/2010 | Furrer .............. B60G 17/08 280/124.161 |
| 2010/0170760 A1 | 7/2010 | Marking |
| 2010/0207351 A1 | 8/2010 | Klieber et al. |
| 2010/0244340 A1 | 9/2010 | Wootten et al. |
| 2010/0252972 A1 | 10/2010 | Cox et al. |
| 2010/0276238 A1 | 11/2010 | Crasset |
| 2010/0276906 A1 | 11/2010 | Galasso et al. |
| 2010/0308628 A1 | 12/2010 | Hsu et al. |
| 2010/0314917 A1 | 12/2010 | Hsieh et al. |
| 2010/0327542 A1 | 12/2010 | Hara et al. |
| 2011/0067965 A1 | 3/2011 | McAndrews |
| 2011/0086686 A1 | 4/2011 | Avent et al. |
| 2011/0095507 A1 | 4/2011 | Plantet et al. |
| 2011/0097139 A1 | 4/2011 | Hsu et al. |
| 2011/0109060 A1 | 5/2011 | Earle et al. |
| 2011/0127706 A1 | 6/2011 | Sims et al. |
| 2011/0174582 A1 | 7/2011 | Wootten et al. |
| 2011/0202236 A1 | 8/2011 | Galasso et al. |
| 2011/0204201 A1 | 8/2011 | Kodama et al. |
| 2011/0214956 A1 | 9/2011 | Marking |
| 2011/0257848 A1 | 10/2011 | Shirai |
| 2011/0284333 A1 | 11/2011 | Krog et al. |
| 2011/0315494 A1 | 12/2011 | Marking |
| 2012/0006949 A1 | 1/2012 | Laird et al. |
| 2012/0018263 A1 | 1/2012 | Marking |
| 2012/0018264 A1 | 1/2012 | King |
| 2012/0048665 A1 | 3/2012 | Marking |
| 2012/0080279 A1 | 4/2012 | Galasso et al. |
| 2012/0181126 A1 | 7/2012 | De Kock |
| 2012/0222927 A1 | 9/2012 | Marking |
| 2012/0228906 A1 | 9/2012 | McAndrews et al. |
| 2012/0253599 A1 | 10/2012 | Shirai |
| 2012/0253600 A1 | 10/2012 | Ichida et al. |
| 2012/0274043 A1 | 11/2012 | Lee et al. |
| 2012/0305350 A1 | 12/2012 | Ericksen et al. |
| 2012/0312648 A1 | 12/2012 | Yu et al. |
| 2013/0001030 A1 | 1/2013 | Goldasz et al. |
| 2013/0037361 A1 | 2/2013 | Park et al. |
| 2013/0090195 A1 | 4/2013 | Yamaguchi et al. |
| 2013/0119634 A1 | 5/2013 | Camp et al. |
| 2013/0144489 A1 | 6/2013 | Galasso et al. |
| 2013/0168195 A1 | 7/2013 | Park et al. |
| 2013/0292218 A1 | 11/2013 | Ericksen et al. |
| 2013/0333993 A1 | 12/2013 | Yu |
| 2014/0008160 A1 | 1/2014 | Marking et al. |
| 2014/0027219 A1 | 1/2014 | Marking et al. |
| 2014/0048365 A1 | 2/2014 | Kim |
| 2014/0061419 A1 | 3/2014 | Wehage et al. |
| 2015/0081171 A1 | 3/2015 | Ericksen et al. |
| 2015/0197308 A1 | 7/2015 | Butora et al. |
| 2016/0153516 A1 | 6/2016 | Marking |
| 2016/0185178 A1 | 6/2016 | Galasso et al. |
| 2016/0290431 A1 | 10/2016 | Marking |
| 2016/0355226 A1 | 12/2016 | Pelot et al. |
| 2017/0008363 A1 | 1/2017 | Ericksen et al. |
| 2017/0136843 A1 | 5/2017 | Marking |
| 2017/0184174 A1 | 6/2017 | Marking |
| 2017/0259876 A1 | 9/2017 | Ericksen et al. |
| 2017/0291466 A1 | 10/2017 | Tong |
| 2018/0010666 A1 | 1/2018 | Marking |
| 2018/0326808 A1 | 11/2018 | Ericksen et al. |
| 2018/0328442 A1 | 11/2018 | Galasso et al. |
| 2018/0328446 A1 | 11/2018 | Ericksen et al. |
| 2018/0334007 A1 | 11/2018 | Ericksen et al. |
| 2018/0334008 A1 | 11/2018 | Ericksen et al. |
| 2018/0335102 A1 | 11/2018 | Haugen |
| 2018/0339565 A1 | 11/2018 | Ericksen et al. |
| 2018/0339566 A1 | 11/2018 | Ericksen et al. |
| 2018/0339567 A1 | 11/2018 | Ericksen et al. |
| 2018/0355946 A1 | 12/2018 | Ericksen et al. |
| 2019/0030975 A1 | 1/2019 | Galasso et al. |
| 2019/0032745 A1 | 1/2019 | Marking |

FOREIGN PATENT DOCUMENTS

| | | |
|---|---|---|
| DE | 3738048 A1 | 5/1989 |
| DE | 3924166 C1 | 2/1991 |
| DE | 4029090 A1 | 3/1992 |
| DE | 4406918 A1 | 9/1994 |
| DE | 10326675 A1 | 12/2004 |
| DE | 202010012738 U1 | 12/2010 |
| EP | 207409 A2 | 1/1987 |
| EP | 304801 A2 | 3/1989 |
| EP | 1241087 A1 | 9/2002 |
| EP | 1355209 A1 | 10/2003 |
| EP | 1623856 A2 | 2/2006 |
| EP | 1757473 A2 | 2/2007 |
| EP | 1825220 A2 | 8/2007 |
| EP | 2103512 A2 | 9/2009 |
| EP | 2189191 A2 | 5/2010 |
| EP | 2248691 A1 | 11/2010 |
| EP | 2357098 A2 | 8/2011 |
| EP | 2410203 A2 | 1/2012 |
| EP | 2479095 A2 | 7/2012 |
| EP | 2495472 A2 | 9/2012 |
| EP | 2357098 B1 | 10/2014 |
| EP | 2848582 A1 | 3/2015 |
| FR | 2529002 A2 | 12/1983 |
| GB | 2289111 A | 11/1995 |
| JP | 57173632 A | 10/1982 |
| JP | 57182506 A | 11/1982 |
| JP | 01106721 A | 4/1989 |
| JP | H0193637 A | 4/1989 |
| JP | H03113139 A | 5/1991 |
| JP | 04203540 A | 7/1992 |
| JP | 05149364 A | 6/1993 |
| JP | H084818 A | 1/1996 |
| JP | 2005119549 A | 5/2005 |
| JP | 2007302211 A | 11/2007 |
| KR | 20070076226 A | 7/2007 |
| WO | 98/40231 | 9/1998 |
| WO | 99/06231 | 2/1999 |
| WO | 0027658 A1 | 5/2000 |

OTHER PUBLICATIONS

European Search Report, European Patent Application No. 14189773. 6, dated May 4, 2015, 4 Pages.

"European Patent Office Final Decision dated Mar. 21, 2013", European Patent Application No. 10161906.2.

"European Search Report and Written Opinion, European Patent Application No. 13165362.8", dated Sep. 24, 2014, 6 Pages.

EP Search Report for European Application No. 15163428.4, dated Jul. 3, 2017, 7 Pages.

"European Search Report for European Application No. 10187320, 12 pages, dated Sep. 25, 2017 (Sep. 25, 2017)".

"European Search Report for European Application No. 11153607, 3 pages, dated Aug. 10, 2012 (Aug. 10, 2012))".

"European Search Report for European Application No. 11172553, 2 pages, dated Sep. 25, 2017 (Sep. 25, 2017)".

"European Search Report for European Application No. 11175126, 2 pages, dated Sep. 25, 2017 (Sep. 25, 2017)".

"European Search Report for European Application No. 12184150, 10 pages, dated Dec. 12, 2017 (Dec. 12, 2017)".

"European Search Report for European Application No. 13174817. 0, 13 pages, dated Jan. 8, 2018 (Jan. 8, 2018))".

"European Search Report for European Application No. 17188022 , 9 pages, dated Feb. 1, 2018 (Feb. 1, 2018))".

Shiozaki, et al., "SP-861-Vehicle Dynamics and Electronic Controlled Suspensions SAE Technical Paper Series No. 910661", International Congress and Exposition, Detroit, Mich., Feb. 25-Mar. 1, 1991.

(56) References Cited

OTHER PUBLICATIONS

Smith, ""The Bump Stop" in Engineer to win—Chapter 13: Springs and Shock Absorbers", MBI Publishing Company and Motorbooks, USA XP055430818, ISBN: 978-0-87938-186-8, Dec. 31, 1984, 207.
Statement of Grounds of Appeal, EP App. No. 11153607.4, May 28, 2018, 88 Pages.
Grounds of Appeal, EP App. No. 11153607.4, Jun. 1, 2018, 28 Pages.
Puhn, "How to Make Your Car Handle", HPBooks, 1981, 7 Pages.
U.S. Appl. No. 61/175,422, filed May 4, 2009, Mario Galasso et al., 17 Pages.
U.S. Appl. No. 61/302,070, filed Feb. 5, 2010, Mario Galasso et al., 39 Pages.
"17 Years of Innovation and Still Evolving", https://www.powertap.com/post/blog-15-17-years-of-innovation-and-still-evolving, Nov. 28, 2018, 8 Pages.
"ANT Message Protocol and Usage", Dynastream Innovations, Inc., Jul. 2, 2007, 68 Pages.
"Basis for Claims Filed Jan. 23, 2015", European Patent Application No. 14189773.6, 2 Pages.
Thum, Notice of Opposition to a European Patent, EP App. No. 14189773.6, Dec. 13, 2018, 49 Pages.
Waechter, et al., "A Multibody Model for the Simulation of Bicycle Suspension Systems", Vehicle System Dynamics, vol. 37, No. 1, 2002, 3-28.
"European Search Report for EP Application No. 18154672, 3 pages, dated Aug. 28, 2018 (Aug. 28, 2018))".
Healey, "The Tyre as Part of the Suspension System", The Institution of Automobile Engineers, Nov. 1924, 26-128.
Kasprzak, "Understanding Your Dampers: A guide from Jim Kasprzak", http://www.kaztechnologies.com/downloads/kaz-tech-tips/ Accessed: Oct. 24, 2018, 25 pages.
Litchfield, "Pneumatic Tires", Transactions (Society of Automobile Engineers), vol. 8, Part II, 1913, 208-223.
Thum, "Oppostion Letter Against EP2357098", Oct. 16, 2018, 39 Pages.
Electronic Translation of DE3709447A1.
Nilsson, "Opposition Letter Against EP-2357098", Oct. 13, 2017, 7.

\* cited by examiner

REMOTELY OPERATED BYPASS FOR A SUSPENSION DAMPER

CROSS-REFERENCE TO RELATED APPLICATIONS

This application claims priority to and is a continuation of the U.S. patent application Ser. No. 14/038,507 filed on Sep. 26, 2013, now U.S. Pat. No. 9,353,818, entitled "REMOTELY OPERATED BYPASS FOR A SUSPENSION DAMPER" by John Marking, assigned to the assignee of the present application, and is hereby incorporated by reference in its entirety.

The application with application Ser. No. 14/038,507 claims to and is a continuation of the then U.S. patent application Ser. No. 13/010,697 filed on Jan. 20, 2011, now U.S. Pat. No. 8,857,580, entitled "REMOTELY OPERATED BYPASS FOR A SUSPENSION DAMPER" by John Marking, assigned to the assignee of the present application, and is hereby incorporated by reference in its entirety.

The application with application Ser. No. 13/010,697 claims priority to the then U.S. Provisional Patent Application No. 61/296,826, entitled "BYPASS LOCK-OUT VALVE FOR A SUSPENSION DAMPER" with the filing date of Jan. 20, 2010, by John Marking, and assigned to the assignee of the present application.

BACKGROUND

Field of the Invention

Embodiments of the present invention generally relate to a damper assembly for a vehicle. More specifically, certain embodiments relate to a remotely operated bypass device used in conjunction with a vehicle damper.

Vehicle suspension systems typically include a spring component or components and a dampening component or components. Typically, mechanical springs, like helical springs are used with some type of viscous fluid-based dampening mechanism and the two are mounted functionally in parallel. In some instances features of the damper or spring are user-adjustable. What is needed is an improved method and apparatus for adjusting dampening characteristics, including remote adjustment.

SUMMARY OF THE INVENTION

The present invention may be used with a damper assembly having a bypass. In one aspect, the assembly comprises a cylinder with a piston and piston rod for limiting the flow rate of damping fluid as it passes from a first to a second portion of said cylinder. A bypass provides fluid pathway between the first and second portions of the cylinder and may be independent of, or in conjunction with, the aforementioned flow rate limitation. In one aspect, the bypass is remotely controllable from a passenger compartment of the vehicle. In another aspect, the bypass is remotely controllable based upon one or more variable parameters associated with the vehicle.

BRIEF DESCRIPTION OF THE DRAWINGS

So that the manner in which the above recited features can be understood in detail, a more particular description may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
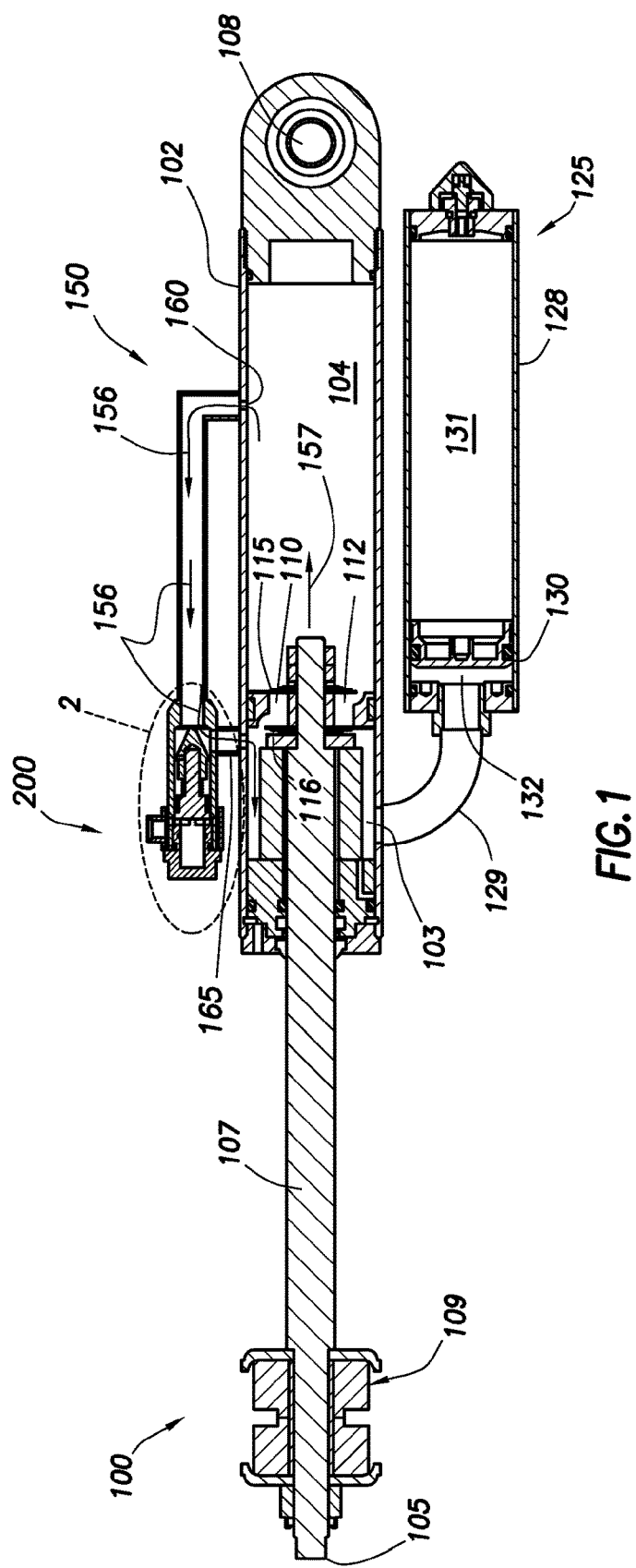
FIG. 1 is a section view showing a suspension damping unit with a remotely operable bypass.

As used herein, the terms "down" "up" "downward" "upward" "lower" "upper" and other directional references are relative and are used for reference only. FIG. 1 is a section view of a suspension damper unit 100. The damper unit 100 includes a damper cylinder 102 with a rod 107 and a piston 105. Typically, the fluid meters from one side of the piston 105 to the other side by passing through flow paths 110, 112 formed in the piston 105. In the embodiment shown, shims 115, 116 are used to partially obstruct the flow paths 110, 112 in each direction. By selecting shims 115, 116 having certain desired stiffness characteristics, the dampening effects caused by the piston 105 can be increased or decreased and dampening rates can be different between the compression and rebound strokes of the piston 105. For example, shims 115 are configured to meter rebound flow from the rebound portion 103 of the damper cylinder 102 to the compression portion 104 of the damper cylinder 102. Shims 116, on the other hand, are configured to meter compression flow from the compression portion 104 of the cylinder to the rebound portion 103. In one embodiment, shims 116 are not included on the rebound portion 103 side, nor is there a compression flow path such as path 112, leaving the piston 105 essentially "locked out" in the compression stroke without some means of flow bypass. Note that piston apertures (not shown) may be included in planes other than those shown (e.g. other than apertures used by paths 110 and 112) and further that such apertures may, or may not, be subject to the shims 115, 116 as shown (because for example, the shims 115, 116 may be clover-shaped or have some other non-circular shape).

A reservoir 125 is in fluid communication with the damper cylinder 102 for receiving and supplying damping fluid as the rod 107 moves in and out of the damper cylinder 102. The reservoir 125 includes a reservoir cylinder 128 in fluid communication with a rebound portion 103 of the damper cylinder 102 via fluid conduit 129. The reservoir also includes a floating piston 130 with a volume of gas on a backside 131 ("blind end" side) of it, the gas being compressible as the reservoir cylinder 128, on the "frontside" 132 fills with damping fluid due to movement of the rod 107 and piston 105 into the damper cylinder 102. Certain features of reservoir type dampers are shown and described in U.S. Pat. No. 7,374,028, which is incorporated herein, in its entirety, by reference. The upper portion of the rod 107 is supplied with a bushing set 109 for connecting to a portion of a vehicle wheel suspension linkage. In another embodiment, not shown, the upper portion of the rod 107 (opposite the piston) may be supplied with an eyelet to be mounted to one part of the vehicle, while the lower part of the housing shown with an eyelet 108 is attached to another portion of the vehicle, such as the frame, that moves independently of the first part. A spring member (not shown) is usually mounted to act between the same portions of the vehicle as the damper unit 100. As the rod 107 and piston 105 move into cylinder 102 (during compression), the damping fluid slows the movement of the two portions of the vehicle relative to each other due to the incompressible fluid moving through the flow paths 112 (past shims 116) provided in the piston 105 and/or through a metered bypass 150, as will be described herein. As the rod 107 and piston 105 move out of the cylinder 102 (during extension or "rebound") fluid meters again through flow paths 110 and the flow rate and corresponding rebound rate is controlled by the shims 115.

In FIG. 1, the piston 105 is shown at full extension and moving downward in a compression stroke, the movement shown by arrow 157. A bypass assembly 150 includes a tubular body 155 that communicates with the damper cylinder 102 through entry pathway 160 and exit pathway 165. The bypass assembly 150 permits damping fluid to travel from a first side of the piston 105 to the other side without traversing shimmed flow paths 110, 112 that may otherwise be traversed in a compression stroke of the damper unit 100. In FIG. 1, the bypass assembly 150 is shown in an "open" position with the flow of fluid through the bypass assembly 150 shown by arrows 156 from a compression portion 104 to a rebound portion 103 of the piston 105. In the embodiment of FIG. 1, the bypass assembly 150 includes a remotely controllable, needle-type check valve/throttle valve 200, located proximate an exit pathway 165 allowing flow in direction arrows 156 and checking flow in opposite direction.

The entry pathway 160 to the bypass assembly 150 in the embodiment shown in FIG. 1, is located towards a lower end of the damper cylinder 102. In one embodiment, as selected by design, the bypass assembly 150 will not operate after the piston 105 passes the entry pathway 160 near the end of a compression stroke. This "position sensitive" feature ensures increased dampening will be in effect near the end of the compression stoke to help prevent the piston 105 from approaching a "bottomed out" position (e.g. impact) in the damper cylinder 102. In some instances, multiple bypasses are used with a single damper and the entry pathways for each may be staggered axially along the length of the damper cylinder in order to provide an ever-increasing amount of dampening (and less bypass) as the piston moves through its compression stroke and towards the bottom of the damping cylinder. Each bypass may include some or all of the features described herein. Certain bypass damper features are described and shown in U.S. Pat. Nos. 6,296,092 and 6,415,895, each of which are incorporated herein, in its entirety, by reference. Additionally, the bypass assembly 150 and remotely controllable valve 200 of the present embodiments can be used in any combination with the bypass valves shown and described in co-pending U.S. patent application Ser. No. 12/684,072.

Figure 2:
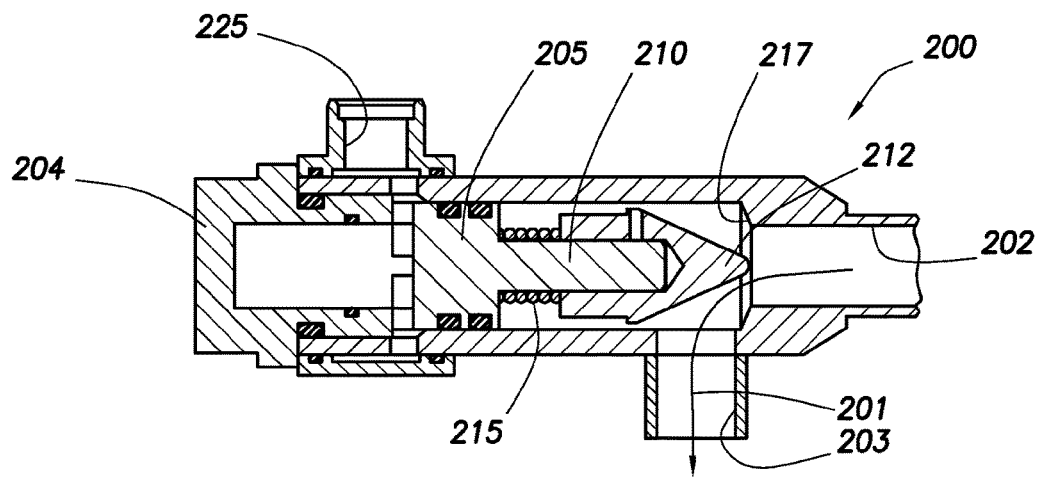
FIG. 2 is an enlarged section view showing the remotely operable valve of the bypass in the open position.
Figure 3:
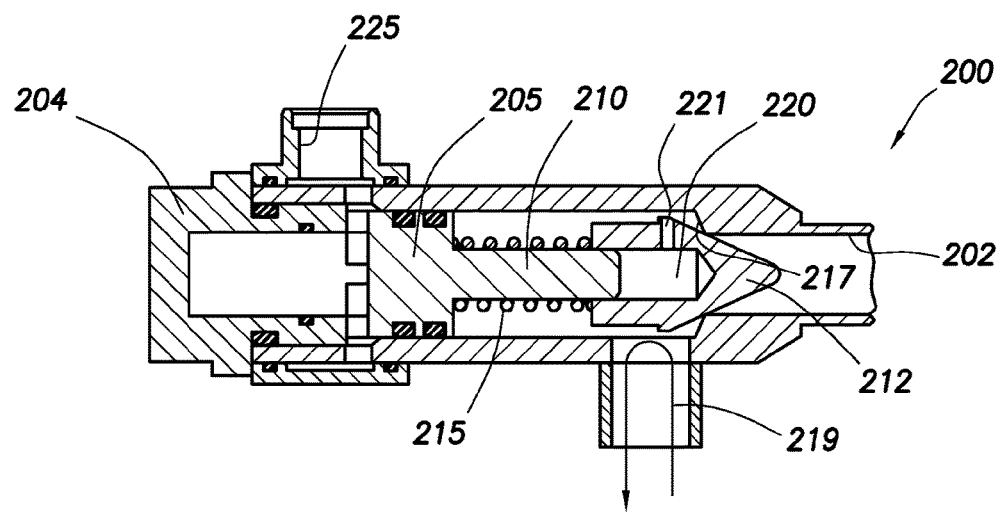
FIG. 3 is a section view showing the valve of FIG. 2 in a closed position.
Figure 4:
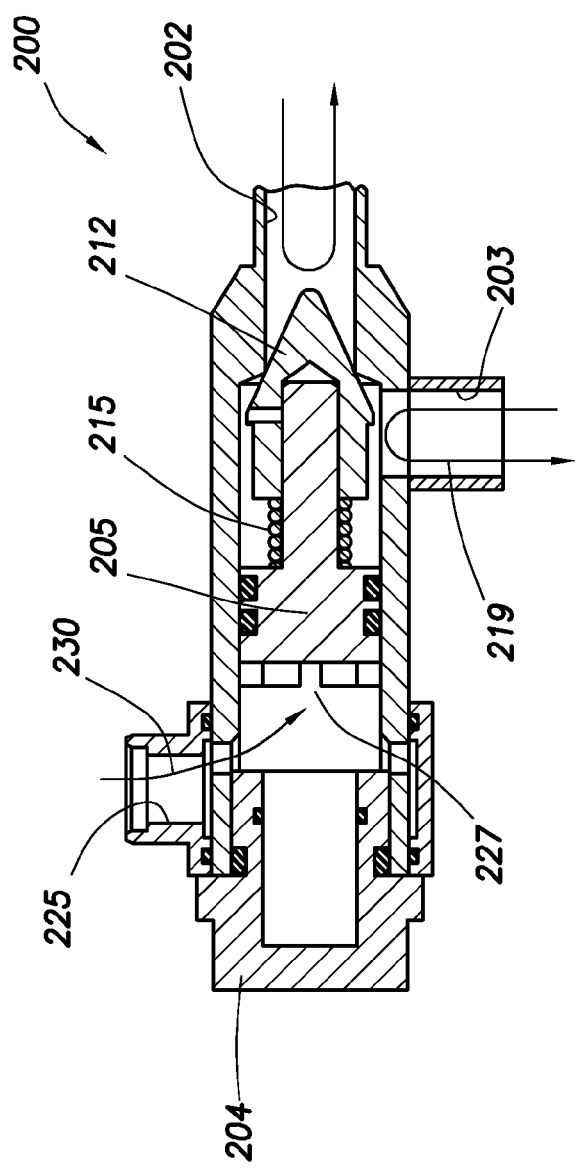
FIG. 4 is a section view showing the valve of FIG. 2 in a locked-out position.

FIGS. 2, 3 and 4 are enlarged views showing the remotely controllable valve 200 in various positions. In FIG. 2, the remotely controllable valve 200 is in a damping-open position (fluid path shown by arrow 201) permitting the bypass assembly 150 to operate in a compression stroke of the damper unit 100. The remotely controllable valve 200 includes a valve body 204 housing a movable piston 205 which is sealed within the body. Three fluid communication points are provided in the body including an inlet 202 and outlet 203 for fluid passing through the remotely controllable valve 200 as well as an inlet 225 for control fluid as will be described herein. Extending from a first end of the piston 205 is a shaft 210 having a cone-shaped member 212 (other shapes such as spherical or flat, with corresponding seats, will also work suitably well) disposed on an end thereof. The cone-shaped member 212 is telescopically mounted relative to, and movable on, the shaft 210 and is biased in an extended position (FIG. 3) due to a spring 215 coaxially mounted on the shaft 210 between the cone-shaped member 212 and the piston 205. Due to the spring 215 biasing, the cone-shaped member 212 normally seats itself against a seat 217 formed in an interior of the valve body 204. In the damping open position shown however, fluid flow through the bypass assembly 150 has provided adequate force on the cone-shaped member 212 to urge it backwards, at least partially loading the spring 215 and creating fluid path 201 from the bypass assembly 150 into a rebound area of the damper cylinder 102 as shown in FIG. 1. The characteristics of the spring 215 are typically chosen to permit the remotely controllable valve 200 (e.g. cone-shaped member 212) to open at a predetermined bypass pressure, with a predetermined amount of control pressure applied to inlet 225, during a compression stroke of the damper unit 100. For a given spring 215, higher control pressure at inlet 225 will result in higher bypass pressure required to open the remotely controllable valve 200 and correspondingly higher damping resistance in the bypass assembly 150 (more compression damping due to that bypass assembly 150). In one embodiment, the remotely controllable valve 200 is open in both directions when the piston 205 is "topped out" against valve body 204. In another embodiment however, when the piston 205 is abutted or "topped out" against valve body 204 the spring 215 and relative dimensions of the remotely controllable valve 200 still allow for the cone-shaped member 212 to engage the valve seat thereby closing the remotely controllable valve 200. In such embodiment backflow from the rebound portion 103 of the damper cylinder 102 to the compression portion 104 is always substantially closed and cracking pressure from flow along path shown by arrows 156 is determined by the pre-compression in the spring 215. In such embodiment, additional fluid pressure may be added to the inlet 225 through port to increase the cracking pressure for flow along path shown by arrows 156 and thereby increase compression damping through the bypass assembly 150 over that value provided by the spring compression "topped out." It is generally noteworthy that while the descriptions herein often relate to compression damping bypass and rebound shut off, some or all of the bypass channels (or channel) on a given suspension unit may be configured to allow rebound damping bypass and shut off or impede compression damping bypass.

FIG. 3 shows the remotely controllable valve 200 in a closed position (which it assumes during a rebound stroke of the damper unit 100). As shown, the cone-shaped member 212 is seated against seat 217 due to the force of the spring 215 and absent an opposite force from fluid entering the remotely controllable valve 200 along path shown by arrows 156 from the bypass assembly 150. As cone-shaped member 212 telescopes out, a gap 220 is formed between the end of the shaft 210 and an interior of cone-shaped member 212. A vent 221 is provided to relieve any pressure formed in the gap 220. With the fluid path 201 closed, fluid communication is substantially shut off from the rebound portion 103 of the damper cylinder 102 into the valve body 204 (and hence through the bypass assembly 150 back to the compression portion 104 is closed) and its "dead-end" path is shown by arrow 219.

Inlet 225 is formed in the valve body 204 for operation of the remotely controllable valve 200. In one embodiment inlet 225 may be pressurized to shift the remotely controllable valve 200 to a third or "locked-out" position. In FIG. 4, the remotely controllable valve 200 is shown in the locked-out position, thereby preventing fluid flow through the bypass assembly 150 in either direction regardless of compression or rebound stroke. In the embodiment shown, the control inlet 225 provides a fluid path 230 to a piston surface 227 formed on an end of the piston 205, opposite the cone-shaped member 212. Specifically, activating pressure is introduced via inlet 225 to move the piston 205 and with it, cone-shaped member 212 toward seat 217. Sufficient activating pressure fully compresses the spring 215 (substantial stack out) and/or closes the gap 220 thereby closing the cone-shaped member 212 against the seat, sealing the bypass assembly 150 to both compression flow and rebound flow. In the embodiment shown, the remotely controllable valve 200 can be shifted to the third, locked-out position from either the first, open position or the second, closed position. Note that, when in the "locked out" position, the remotely controllable valve 200 as shown will open to compression flow along path shown by arrows 156 when the compression flow pressure acting over the surface area of the cone-shaped member 212 exceeds the inlet 225 pressure acting over the surface area of the piston 205. Such inlet 225 pressure may be selected to correspond therefore to a desired compression overpressure relief value or "blow off" value thereby allowing compression bypass under "extreme" conditions even when the bypass assembly 150 is "locked out".

In the embodiment illustrated, the remotely controllable valve 200 is intended to be shifted to the locked-out position with control fluid acting upon piston 205. In one embodiment, the activating pressure via inlet 225 is adjusted so that the remotely controllable valve 200 is closed to rebound fluid (with the cone-shaped member 212 in seat 217) but with the spring 215 not fully compressed or stacked out. In such a position, a high enough compression force (e.g. compression flow) will still open the remotely controllable valve 200 and allow fluid to pass through the remotely controllable valve 200 in a compression stroke. In one arrangement, the activating pressure, controlled remotely, may be adjusted between levels where the lock-out is not energized and levels where the lock-out is fully energized. The activating pressure may also be adjusted at intermediate levels to create more or less damping resistance through the bypass assembly 150. The activating pressure may be created by hydraulic or pneumatic input or any other suitable pressure source.

In one example, the remotely controllable valve 200 is moved to a locked-out position and the bypass feature is disabled by remote control from a simple operator-actuated switch located in the passenger compartment of the vehicle. In one embodiment, fluid pressure for controlling (e.g. locking-out) the remotely controllable valve 200 is provided by the vehicle's on-board source of pressurized hydraulic fluid created by, for example, the vehicle power steering system. In one embodiment, pneumatic pressure is used to control (e.g. close) the remotely controllable valve 200 where the pneumatic pressure is generated by an on-board compressor and accumulator system and conducted to the remotely controllable valve 200 via a fluid conduit. In one embodiment, a linear electric motor (e.g. solenoid), or other suitable electric actuator, is used, in lieu of the aforementioned inlet 225 pressure, to move the "piston 205" axially within valve body 204. A shaft of the electric actuator (not shown) may be fixed to the piston 205 such that axial movement of the shaft causes axial movement of the piston 205 which in turn causes movement of the cone-shaped member 212 (and compression of the spring 215 as appropriate). In one embodiment, the electric actuator is configured to "push" the piston 205 towards a closed position and to "pull" the piston 205 away from the closed position depending on the direction of the current switched through the actuator.

Figure 5:
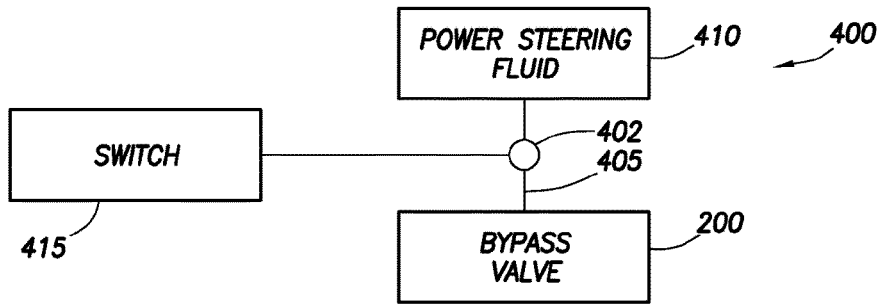
FIG. 5 is a schematic diagram showing a control arrangement for a remotely operated bypass.

FIG. 5 is a schematic diagram illustrating a sample circuit 400 used to provide remote control of a remotely controllable valve 200 using a vehicle's power steering fluid (although any suitable fluid pressure source may be substituted for reservoir 410 as could be an electrical current source in the case of an remotely controllable valve 200). As illustrated, a fluid pathway 405 having a switch-operated valve (and/or pressure regulator) 402 therein runs from a fluid (or current) reservoir 410 that is kept pressurized by, in one embodiment, a power steering pump (not shown) to a remotely controllable valve 200 that is operable, for example, by a user selectable dash board switch 415. The switch-operated valve 402 permits fluid to travel to the remotely controllable valve 200, thereby urging it to a closed position. When the switch 415 is in the "off" position, working pressure within the damper unit 100, and/or a biasing member such as a spring or annular atmospheric chamber (not shown), returns the bypass assembly 150 to its normally-open position (with or without residual spring compression as designed). Hydraulically actuated valving for use with additional components is shown and described in U.S. Pat. No. 6,073,536 and that patent is incorporated by reference herein in its entirety.

While FIG. 5 is simplified and involves control of a single bypass valve, it will be understood that the switch-operated valve 402 could be plumbed to simultaneously or selectively (e.g. multi-position valve) provide a signal to two or more (e.g. four) bypass valves operable with two or more vehicle dampers and/or with a single damper having multiple bypass channels and multiple corresponding valves (e.g. remotely controllable valve 200) (or multiple dampers having multiple bypass channels). Additional switches could permit individual operation of separate damper bypass valves in individual bypass channels, whether on separate dampers or on the same multiple bypass damper, depending upon an operator's needs. While the example of FIG. 5 uses fluid power for operating the remotely controllable valve 200, a variety of means are available for remotely controlling a remotely controllable valve 200. For instance, a source of electrical power from a 12 volt battery could be used to operate a solenoid member, thereby shifting a piston 205 in remotely controllable valve 200 between open and closed positions. The remotely controllable valve 200 or solenoid operating signal can be either via a physical conductor or an RF signal (or other wireless such as Bluetooth, WiFi, ANT) from a transmitter operated by the switch 415 to a receiver operable on the remotely controllable valve 200 (which would derive power from the vehicle power system such as 12 volt).

A remotely operable bypass like the one described above is particularly useful with an on/off road vehicle. These vehicles can have as much as 20" of shock absorber travel to permit them to negotiate rough, uneven terrain at speed with usable shock absorbing function. In off-road applications, compliant dampening is necessary as the vehicle relies on its long travel suspension when encountering often large off-road obstacles. Operating a vehicle with very compliant, long travel suspension on a smooth road at higher speeds can be problematic due to the springiness/sponginess of the suspension and corresponding vehicle handling problems associated with that (e.g. turning roll, braking pitch). Such compliance can cause reduced handling characteristics and even loss of control. Such control issues can be pronounced when cornering at high speed as a compliant, long travel vehicle may tend to roll excessively. Similarly, such a vehicle may pitch and yaw excessively during braking and acceleration. With the remotely operated bypass dampening and "lock out" described herein, dampening characteristics of a shock absorber can be completely changed from a compliantly dampened "springy" arrangement to a highly dampened and "stiffer" (or fully locked out) system ideal for higher speeds on a smooth road. In one embodiment where compression flow through the piston 105 is completely blocked, closure of the bypass assembly 150 results in substantial "lock out" of the suspension (the suspension is rendered essentially rigid). In one embodiment where some compression flow is allowed through the piston 105 (e.g. port 112 and shims 116), closure of the bypass assembly 150 (closure of remotely controllable valve 200) results in a stiffer but still functional compression damper. In one embodiment, the shims 116 are sized, to optimize damping when the bypass assembly 150 is open and when bypass assembly 150 is closed based on total anticipated driving conditions. In one embodiment the remotely controllable valve 200 is closed but may be opened at a predetermined compression flow pressure resulting in fairly stiff handling but maintaining an ability for the vehicle to absorb relatively large bumps. In one embodiment a bypass assembly 150 having an entry pathway 160 located axially toward an upward (or "rebound" end) end of damper cylinder 102 remains wide open while other bypass channels having corresponding entry pathways 160 located axially more toward the compression end of damper cylinder 102 are closed or highly restricted. Such would result in a suspension that would readily absorb small amplitude compressions (smooth highway ride) but would resist large compression deflections of low force magnitude (as during heavy cornering or braking) and would absorb large deflections of high force magnitude. A vehicle so configured would ride well on pavement (smooth surface), would absorb large unexpected bumps and would generally not wallow when cornering or braking.

Figure 6:
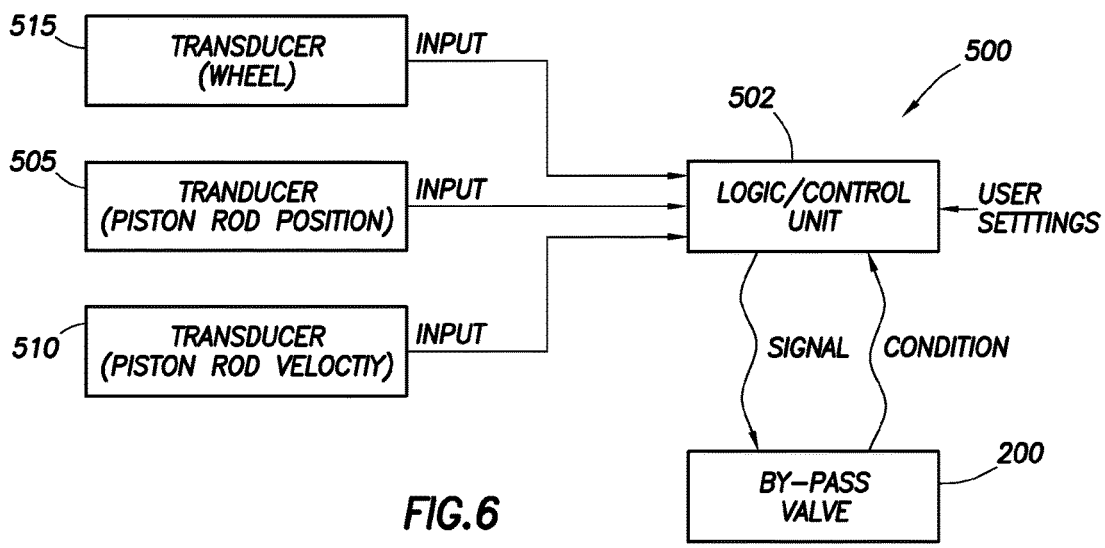
FIG. 6 is a schematic diagram showing another control arrangement for a remotely operated bypass.

In addition to, or in lieu of, the simple, switch operated remote arrangement of FIG. 5, the remote bypass can be operated automatically based upon one or more driving conditions. FIG. 6 shows a schematic diagram of a remote control system 500 based upon any or all of vehicle speed, damper rod speed, and damper rod position. One embodiment of FIG. 6 is designed to automatically increase dampening in a shock absorber in the event a damper rod reaches a certain velocity in its travel towards the bottom end of a damper at a predetermined speed of the vehicle. In one embodiment the system adds dampening (and control) in the event of rapid operation (e.g. high rod velocity) of the damper to avoid a bottoming out of the damper rod as well as a loss of control that can accompany rapid compression of a shock absorber with a relative long amount of travel. In one embodiment the system adds dampening (e.g. closes or throttles down the bypass) in the event that the rod velocity in compression is relatively low, but the rod progresses past a certain point in the travel. Such configuration aids in stabilizing the vehicle against excessive low rate suspension movement events such as cornering roll, braking and acceleration yaw and pitch and "g-out."

FIG. 6 illustrates, for example, a system including three variables: rod speed, rod position and vehicle speed. Any or all of the variables shown may be considered by processor 502 in controlling the valve 200. Any other suitable vehicle operation variable may be used in addition to or in lieu of the variables 515, 505, 510 such as for example piton rod compression strain, eyelet strain, vehicle mounted accelerometer (or tilt/inclinometer) data or any other suitable vehicle or component performance data. In one embodiment piston 105 position within cylinder 102 is determined using an accelerometer to sense modal resonance of cylinder 102. Such resonance will change depending on the position of the piston 105 and an on-board processor (computer) is calibrated to correlate resonance with axial position. In one embodiment, a suitable proximity sensor or linear coil transducer or other electro-magnetic transducer is incorporated in the dampening cylinder to provide a sensor to monitor the position and/or speed of the piston (and suitable magnetic tag) with respect to the cylinder. In one embodiment, the magnetic transducer includes a waveguide and a magnet, such as a doughnut (toroidal) magnet that is joined to the cylinder and oriented such that the magnetic field generated by the magnet passes through the piston rod and the waveguide. Electric pulses are applied to the waveguide from a pulse generator that provides a stream of electric pulses, each of which is also provided to a signal processing circuit for timing purposes. When the electric pulse is applied to the waveguide a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines. By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, either digital, or analog, proportional to the calculated distance and/or velocity. A transducer-operated arrangement for measuring rod speed and velocity is described in U.S. Pat. No. 5,952,823 and that patent is incorporated by reference herein in its entirety.

While a transducer assembly located at the damper measures rod speed and location, a separate wheel speed transducer for sensing the rotational speed of a wheel about an axle includes housing fixed to the axle and containing therein, for example, two permanent magnets. In one embodiment the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118 which is incorporated herein by reference in its entirety.

In one embodiment, as illustrated in FIG. 6, a logic unit 502 with user-definable settings receives inputs from the rod speed 510 and location 505 transducers as well as the wheel speed transducer 515. The logic unit is user-programmable and depending on the needs of the operator, the unit records the variables and then if certain criteria are met, the logic circuit sends its own signal to the bypass to either close or open (or optionally throttle) the bypass valve 200. Thereafter, the condition of the bypass valve is relayed back to the logic unit 502.

Figure 7:
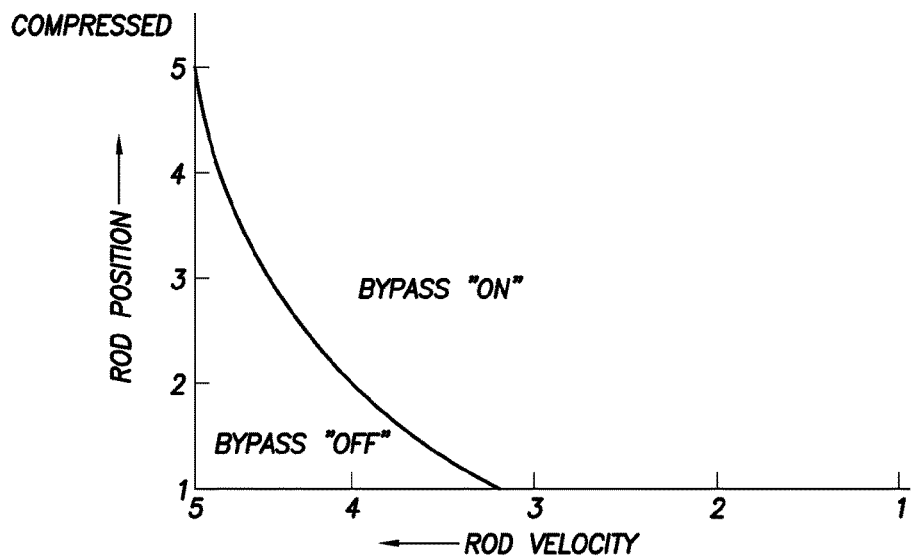
FIG. 7 is a graph showing some operational characteristics of the arrangement of FIG. 4.

FIG. 7 is a graph that illustrates a possible operation of one embodiment of the bypass assembly 500 of FIG. 6. The graph assumes a constant vehicle speed. For a given vehicle speed, rod position is shown on a y axis and rod velocity is shown on an x axis. The graph illustrates the possible on/off conditions of the bypass at combinations of relative rod position and relative rod velocity. For example, it may be desired that the bypass is operable (bypass "on") unless the rod is near its compressed position and/or the rod velocity is relatively high (such as is exemplified in FIG. 7). The on/off configurations of FIG. 7 are by way of example only and any other suitable on/off logic based on the variable shown or other suitable variables may be used. In one embodiment it is desirable that the damper become relatively stiff at relatively low rod velocities and low rod compressive strain (corresponding for example to vehicle roll, pitch or yaw) but remains compliant in other positions. In one embodiment the piston rod 107 includes a "blow off" (overpressure relief valve typically allowing overpressure flow from the compression side to the rebound side) valve positioned in a channel coaxially disposed though the rod 107 and communicating one side of the piston (and cylinder) with the other side of the piston (and cylinder) independently of the apertures 110,112 and the bypass 150.

In one embodiment, the logic shown in FIG. 6 assumes a single damper but the logic circuit is usable with any number of dampers or groups of dampers. For instance, the dampers on one side of the vehicle can be acted upon while the vehicles other dampers remain unaffected.

While the examples illustrated relate to manual operation and automated operation based upon specific parameters, the remotely operated bypass can be used in a variety of ways with many different driving and road variables. In one example, the bypass is controlled based upon vehicle speed in conjunction with the angular location of the vehicle's steering wheel. In this manner, by sensing the steering wheel turn severity (angle of rotation), additional dampening can be applied to one damper or one set of dampers on one side of the vehicle (suitable for example to mitigate cornering roll) in the event of a sharp turn at a relatively high speed. In another example, a transducer, such as an accelerometer measures other aspects of the vehicle's suspension system, like axle force and/or moments applied to various parts of the vehicle, like steering tie rods, and directs change to the bypass valve positioning in response thereto. In another example, the bypass can be controlled at least in part by a pressure transducer measuring pressure in a vehicle tire and adding dampening characteristics to some or all of the wheels in the event of, for example, an increased or decreased pressure reading. In one embodiment the damper bypass or bypasses are controlled in response to braking pressure (as measured for example by a brake pedal sensor or brake fluid pressure sensor or accelerometer) In still another example, a parameter might include a gyroscopic mechanism that monitors vehicle trajectory and identifies a "spin-out" or other loss of control condition and adds and/or reduces dampening to some or all of the vehicle's dampers in the event of a loss of control to help the operator of the vehicle to regain control.

While the foregoing is directed to embodiments of the present invention, other and further embodiments of the invention may be devised without departing from the basic scope thereof, and the scope thereof is determined by the claims that follow.

What we claim is:

1. A vehicle suspension damper comprising:
   a damper cylinder;
   damping fluid disposed within said damper cylinder;
   a piston assembly disposed within said damper cylinder, said piston assembly comprising:
     a piston having a flow path formed through said piston;
     a shim disposed to meter flow of said damping fluid through said flow path; and
     a piston rod coupled to said piston;
   a bypass assembly providing a fluid pathway between a first side of said piston and a second side of said piston, said bypass assembly comprising:
     a remotely controllable needle valve for controlling the flow of said damping fluid through said bypass assembly, said remotely controllable needle valve controlled by an operator-actuated switch located in a passenger compartment of a vehicle to which said vehicle suspension damper is coupled, said remotely controllable needle valve comprising:
       a valve body;
       a movable piston housed within said valve body, an axial position of said movable piston controllable with respect to said valve body, said axial position of said movable piston controlling fluid flow through said remotely controllable needle valve, said movable piston having a shaft extending from a first end of said movable piston;
       a spring mounted coaxially on said shaft;
       a movable member telescopically mounted to said shaft, said spring biasing said movable member in an extended position with respect to said first end of said movable piston;
       an inlet formed in said valve body;
       an outlet formed in said valve body, said inlet and said outlet for enabling said fluid flow through said valve body; and
       a control fluid inlet formed in said valve body, a pressure of control fluid at said control fluid inlet configured to adjust said axial position of said movable piston and determine a bypass pressure required to open said remotely controllable needle valve, wherein said axial position of said movable piston is changed when said movable member is in a locked out position with respect to said inlet and a pressure acting over a surface area of said movable member exceeds a pressure of said control fluid acting over a surface area of said movable piston.

2. The vehicle suspension damper of claim 1 further comprising:
   a reservoir in fluid communication with said damper cylinder.

3. The vehicle suspension damper of claim 1 wherein said reservoir further comprises:
   a reservoir cylinder portion;
   a rebound portion in fluid communication with said damper cylinder; and a floating piston disposed within said reservoir cylinder portion.

4. The vehicle suspension damper of claim 1, wherein said remotely controllable needle valve is configured to selectively permit said flow of said damping fluid through said bypass assembly.

5. The vehicle suspension damper of claim 1, wherein said remotely controllable needle valve is configured to selectively prevent said flow of said damping fluid through said bypass assembly.

6. The vehicle suspension damper of claim 1 wherein said damper cylinder further comprises:
an entry pathway, said entry pathway located in said damper cylinder and fluidically coupling said bypass assembly and said damper cylinder, said entry pathway disposed at a location in said damper cylinder such that said damping fluid will not flow from said damper cylinder into said bypass assembly after said piston passes said entry pathway during a compression stroke.

7. The vehicle suspension damper of claim 1 wherein said remotely controllable needle valve is coupled to an on-board source of pressurized hydraulic fluid for said vehicle to which said vehicle suspension damper is coupled.

8. The vehicle suspension damper of claim 1 wherein said remotely controllable needle valve is coupled to a power steering system for said vehicle to which said vehicle suspension damper is coupled.

9. The vehicle suspension damper of claim 1 wherein said remotely controllable needle valve is coupled to pneumatic pressure, said pneumatic pressure is generated by an on-board compressor and accumulator system and conducted to said remotely controllable valve via a fluid conduit, said on-board compressor and said accumulator system coupled to said vehicle to which said vehicle suspension damper is coupled.

10. A vehicle suspension damper comprising:
a cylinder;
damping fluid disposed within said cylinder;
a piston assembly disposed within said cylinder, said piston assembly comprising:
  a piston having a flow path formed through said piston;
  a shim disposed to meter flow of said damping fluid through said flow path; and
  a piston rod coupled to said piston;
a bypass assembly providing a fluid pathway between a first side of said piston and a second side of said piston, said bypass assembly comprising:
  a remotely controllable needle valve for permitting or preventing the flow of said damping fluid through said bypass assembly, said remotely controllable needle valve controlled based upon a variable parameter associated with a vehicle to which said vehicle suspension damper is coupled, said remotely controllable needle valve comprising:
    a valve body;
    a movable piston housed within said valve body, an axial position of said movable piston controllable with respect to said valve body, said axial position of said movable piston controlling fluid flow through said remotely controllable needle valve, said movable piston having a shaft extending from a first end of said movable piston;
    a spring mounted coaxially on said shaft;
    a movable member telescopically mounted to said shaft, said spring biasing said movable member in an extended position with respect to said first end of said movable piston;
    an inlet formed in said valve body;
    an outlet formed in said valve body, said inlet and said outlet for enabling said fluid flow through said valve body; and
    a control fluid inlet formed in said valve body, a pressure of control fluid at said control fluid inlet configured to adjust said axial position of said movable piston and determine a bypass pressure required to open said remotely controllable needle valve, wherein said axial position of said movable piston is changed when said movable member is in a locked out position with respect to said inlet and a pressure acting over a surface area of said movable member exceeds a pressure of said control fluid acting over a surface area of said movable piston.

11. The vehicle suspension damper of claim 10 wherein said variable parameter associated with said vehicle is selected from the group consisting of: vehicle speed, piston rod speed, and piston rod position.

12. The vehicle suspension damper of claim 10 further comprising:
a reservoir in fluid communication with said damper cylinder.

13. The vehicle suspension damper of claim 10 wherein said reservoir further comprises:
a reservoir cylinder portion;
a rebound portion in fluid communication with said damper cylinder; and
a floating piston disposed within said reservoir cylinder portion.

14. The vehicle suspension damper of claim 10, wherein said remotely controllable needle valve is configured to selectively permit said flow of said damping fluid through said bypass assembly.

15. The vehicle suspension damper of claim 10, wherein said remotely controllable needle valve is configured to selectively prevent said flow of said damping fluid through said bypass assembly.

16. The vehicle suspension damper of claim 10 wherein said damper cylinder further comprises:
an entry pathway, said entry pathway located in said damper cylinder and fluidically coupling said bypass assembly and said damper cylinder, said entry pathway disposed at a location in said damper cylinder such that said damping fluid will not flow from said damper cylinder into said bypass assembly after said piston passes said entry pathway during a compression stroke.

17. The vehicle suspension damper of claim 10 wherein said remotely controllable needle valve is coupled to an on-board source of pressurized hydraulic fluid for a vehicle to which said vehicle suspension damper is coupled.

18. The vehicle suspension damper of claim 10 wherein said remotely controllable needle valve is coupled to a power steering system for a vehicle to which said vehicle suspension damper is coupled.

19. The vehicle suspension damper of claim 10 wherein said remotely controllable needle valve is coupled to pneumatic pressure, said pneumatic pressure is generated by an on-board compressor and accumulator system and conducted to said remotely controllable needle valve via a fluid conduit, said on-board compressor and said accumulator system coupled to said vehicle to which said vehicle suspension damper is coupled.

20. The vehicle suspension damper of claim 10 wherein said variable parameter associated with said vehicle is selected from the group consisting of: piston rod compression strain, eyelet strain, vehicle mounted accelerometer data, and tilt/inclinometer data.

21. The vehicle suspension damper of claim 10 wherein said variable parameter associated with said vehicle is selected from the group consisting of: speed of said vehicle in conjunction with an angular location of said vehicle's steering wheel, movement of a suspension system of said vehicle, pressure in a tire of said vehicle tire, braking pressure applied to a brake of said vehicle, and trajectory of said vehicle.

* * * * *